Aug. 27, 1940.　　　　　B. KNOPP　　　　　2,213,009
EGG CANDLER AND DATER
Filed Sept. 7, 1937
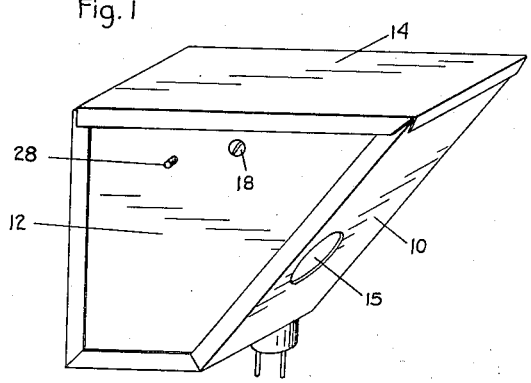
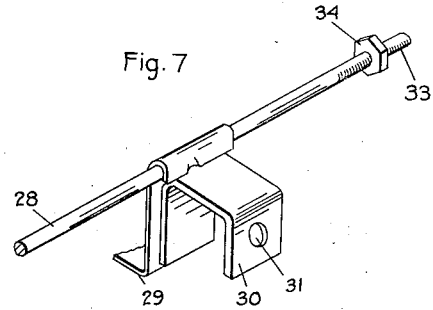
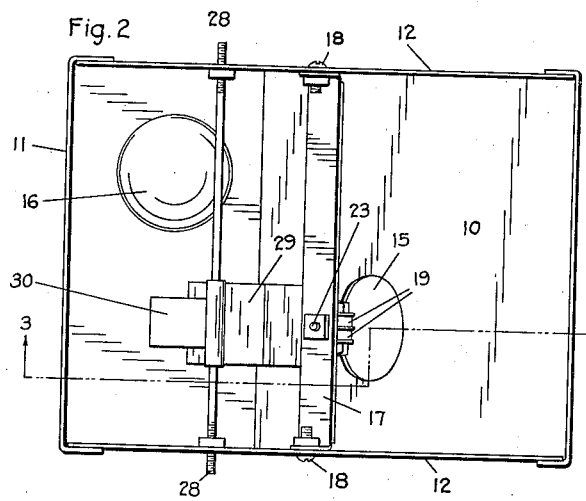
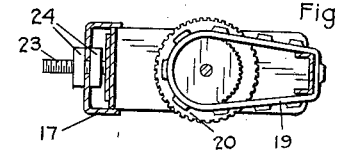
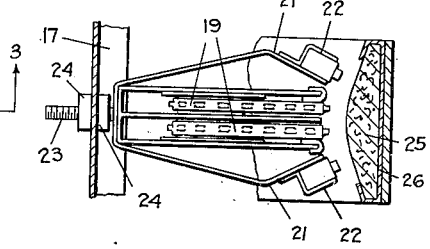
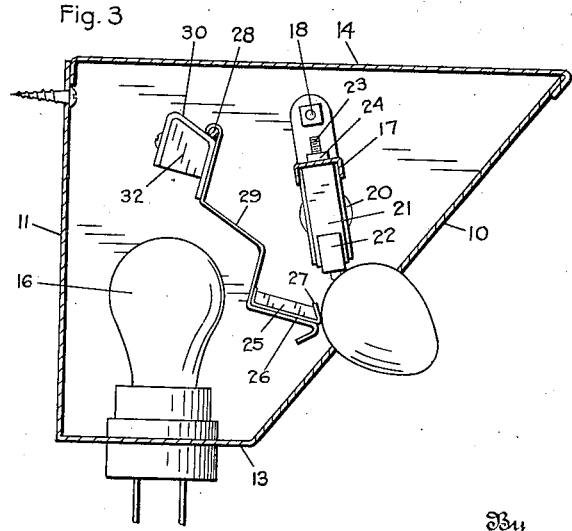
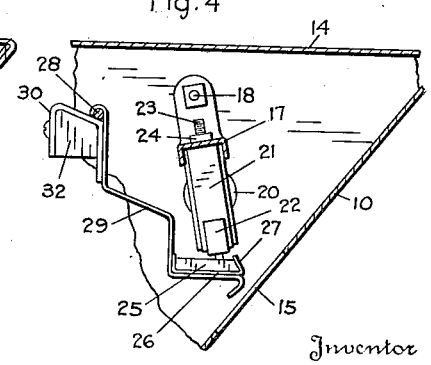
Inventor
Bernard Knopp
By Emil F. Lange
Attorney Patented Aug. 27, 1940

2,213,009

UNITED STATES PATENT OFFICE 2,213,009

EGG CANDLER AND DATER

Bernard Knopp, Bennett, Nebr.

Application September 7, 1937, Serial No. 162,674

2 Claims. (Cl. 88—14.2)

My invention relates to egg candlers and daters, one of its objects being the provision of an egg candler which is provided with a dating stamp for applying the date to the egg at the time of candling the egg.

Another of my objects is the provision of an egg candler and dater which is operable in the manner of all egg candlers and which applies the date to the egg without extra effort on the part of the operator.

Another of my objects is the provision of an egg candler having a dating stamp in the path of the egg and having an ink pad which is so mounted that it will be normally against the dating stamp to be displaced therefrom by the movement of the egg.

Another object which I have in view is the provision of a dating stamp combined with a floating ink pad which is normally held in contact with the dating stamp but which is so designed that an egg may be introduced between the dating stamp and the pad without smearing the egg from either the dating stamp or the pad.

Another of my objects is the provision of an egg candler having a dating stamp and a floating ink pad so positioned that the date may be stamped on the egg, the parts being adjustable to accommodate eggs of different sizes.

Having in view these objects and others which will be pointed out in the following description, I will now refer to the drawing, in which Figure 1 is a view in isometric projection of the egg dater and candler.

Figure 2 is a plan view of the egg candler and dater as seen when the lid is removed.

Figure 3 is a view in section on the line 3—3 of Figure 2, the lid also being shown.

Figure 4 is a fragment showing the operative parts of Figure 3 in their position at rest and ready for receiving an egg.

Figure 5 is a view showing a side of the dating stamp, a sectioned portion of the ink pad being also shown.

Figure 6 is an edge view of the ink pad.

Figure 7 is a view in perspective showing the rocking mechanism for the ink pad.

The casing includes a front wall 10, a rear wall 11, a pair of side walls 12, and a bottom 13. The entire casing is covered by means of a lid 14 having down-turned flanges, the front and side flanges being on the outer side of the casing while the rear flange bears against the inner side of the rear wall 11 as shown in Figure 3. The rear wall 11 is provided with apertures for the insertion of screws or other suitable fastening devices for securing the casing to a vertical support. The front wall 10 is provided with a single circular aperture 15 for the partial insertion of an egg to be candled and dated. A light source, such as the bulb 16, furnishes the illumination for candling the eggs. It should be noted that the bulb 16 is offset and out of the line of vision of the operator. The inner walls of the casing are coated with a glossy reflecting surface of suitable color for illuminating the interior of the casing with diffused light for most effectively viewing the contents of the egg.

The dater is secured to a horizontally positioned support 17 which has upturned ears as shown in Figure 2. The pivot pins 18 pass through the ears and provide for angular adjustment of the support 17. The dater in the present instance includes a pair of endless rubber bands 19 having numerals thereon for designating the day of the month. These bands are secured to the frame of the dater and they may be actuated by the toothed wheels 20 in order to expose any given day of the month. At the sides are two frame members 21 having sockets 22 for the insertion of rubber type to indicate the name of the month and the number of the year or any other suitable indicia. By reference to Figure 5 it will be seen that the faces of the type are disposed on a curved surface corresponding to that of the ordinary egg.

The dating stamp has a stem 23 projecting upwardly therefrom for passing through a suitable aperture in the support 17. The stem 23 is screw threaded for applying a nut or nuts 24. Only a small range of adjustment in length of the dating stamp is required and when this is to be dispensed with, a single nut 24 on the upper side of the support 17 is all that is required. If, however, it is desired to adjust the length of the dating stamp, nuts should be applied both above and below the support 17 as shown in Figures 5 and 6. The dating stamp is positioned in the path of the egg as shown in Figure 3 in a manner such that the stamp will not contact with the egg until the egg has been fully inserted in the aperture 15. The inward movement of the egg is stopped both by the size of the opening 15 and by contacting with the dating stamp as a stop.

The dating stamp must be inked after each operation and this must be automatic in order to avoid the loss of time. The pad 25 has a round surface as shown in Figure 5 and it is seated in a casing 26. The front wall 27 of the casing is inclined in such a direction that the egg will ride on the inclined front wall 27 as the egg is moved inwardly. At 28 is a shaft which serves as a pivot for the lever 29 carrying the ink pad 25. The parts are so arranged and so adjusted that the ink pad 25 may be moved into direct contact with the face of the type. At the rear of the shaft 28 is a weight support 30 having an aperture 31 whereby a suitable weight 32 may be secured thereto for counterbalancing the lever 29 with its ink pad 25. The weight 32 is preferably slightly in excess of its requirements so as to normally hold the pad 25 in contact with the type. The lever 29 is rigidly secured to the shaft 28 which is journalled at its ends in the side walls 12. The shaft 28 is freely slidable through the apertures in the side walls which thus facilitates assemblage but the shaft must be held against accidental displacement. For this reason both end portions of the shaft are screw threaded at 33 for receiving nuts 34 which bear against the inner surfaces of the side walls 12. The nuts 34 thus hold the shaft 28 against displacement but they also facilitate the lateral adjustment of the pad 25 when it is felt to be necessary that the pad must be shifted to one side or the other for more evenly inking the type.

In use the casing is secured to a wall of the room or to any other suitable vertical support and at a convenient height. The stamp pad support and the stamp support are then adjusted both relative to each other and to the shape and size of the eggs to be candled and dated. Such adjustment is ordinarily not required since most eggs may readily be stamped without further adjustment. It is only eggs which are unusually large or unusually small which make adjustment desirable. The eggs are then passed into the aperture 15 whereupon they are instantly illuminated by the reflected light from the bulb 16. The condition of the contents of the eggs reveals almost instantly whether or not the egg is perfect or imperfect. As soon as the egg is seated in the aperture 15 and not before, the dater contacts with the egg to stamp the date or other indicia thereon.

As an egg candler alone, the present device has superior advantages over most of the egg candlers now in use. The operator's eyes are not subjected to the glare of light coming from a source of light which is in the direct line of vision. Since the bulb 16 is out of the line of sight, it is only the reflected light passing through the egg which reaches the operator. During the change of eggs in the aperture 15, the operator receives only the reflected rays passing through the aperture. The color of these light rays is such as to make it easy on the operator's eyes. During candling, the upper portion of the front wall 10 acts as a shield to further protect the operator's eyes.

Having thus described my invention in such full, clear, and exact terms that its construction and operation will be readily understood by others skilled in the art to which it pertains, what I claim as new and desire to secure by Letters Patent of the United States is:

1. An egg candler and dater including a casing having a source of light therein, said casing having an opening for the insertion of an egg, a dating stamp, means for rigidly securing said dating stamp to the casing in the path of movement of the egg, an ink pad, a lever pivotally mounted in said casing and supporting said ink pad for movement over an arcuate path terminating at the face of said stamp, means biasing said lever to a position in which said pad is in inking engagement with said stamp, and means associated with said supporting lever in the path of the egg for swinging said lever and said pad away from said stamp due to the pressure of the egg against said last named means as the egg is moved forwardly into contact with the stamp.

2. An egg candler and dater including a casing having a source of light therein, said casing having an opening for the insertion of an egg, a dating stamp, means for rigidly securing said dating stamp to the casing in the path of movement of the egg, an ink pad, a lever pivotally mounted in said casing and supporting said ink pad for movement over an arcuate path terminating at the face of said stamp and substantially perpendicularly intersecting the path of movement of the egg, and means biasing said supporting lever to a position in which said pad is in inking engagement with said stamp, said supporting lever being provided with means including an inclined forward surface in the path of the egg but displaced from the longitudinal center line of said path, said surface being inclined at an angle such as to be non-perpendicular to any line passing through said surface and the pivot point of said lever so that the pressure of the egg on said forward surface during forward movement of the egg will swing said supporting lever and pad away from said stamp along said arcuate path, and said forward surface being inclined at an angle such that it slides over the surface of the egg as the egg is moved forwardly.

BERNARD KNOPP.